Patented Oct. 7, 1947

2,428,755

UNITED STATES PATENT OFFICE 2,428,755

PREPARATION OF ETHYL FLUOSULFONATE

Carl B. Linn, Riverside, Ill., assignor to Universal Oil Products Company, Chicago, Ill., a corporation of Delaware No Drawing. Application February 23, 1946, Serial No. 649,745

5 Claims. (Cl. 260—456)

This invention relates to a process for preparing an ester of fluosulfonic acid and particularly for preparing ethyl fluosulfonate.

An object of this invention is to prepare ethyl fluosulfonate.

One specific embodiment of the present invention relates to a process for preparing ethyl fluosulfonate which comprises reacting ethyl fluoride and fluosulfonic acid.

A further embodiment of this invention relates to a process for preparing ethyl fluosulfonate which comprises reacting ethyl fluoride and fluosulfonic acid at a temperature of from about −30° to about 50° C.

Previously, ethyl fluosulfonate was prepared in yields of not more than about 30% of the theoretical by the action of fluosulfonic acid upon diethyl ether or upon ethyl alcohol. This method described by Meyer and Schramm, Z. anorg. allgem. Chem., 206, 24 (1932) is illustrated by the following equation:

$$(C_2H_5)_2O + 2HFSO_3 \rightarrow 2C_2H_5FSO_3 + H_2O$$

When starting with ethyl alcohol the reaction used by Meyer and Schramm is illustrated by the following equation:

$$C_2H_5OH + HFSO_3 \rightarrow C_2H_5FSO_3 + H_2O$$

I have found that ethyl fluoride reacts with fluosulfonic acid at a temperature of from about −30° to about 50° C. and preferably at a temperature of from about −10° to about +10° C. to give 64% or more of the theoretical yield of ethyl fluosulfonate according to the equation:

$$HFSO_3 + C_2H_5F \rightarrow HF + C_2H_5FSO_3$$

My process is carried out in a suitable reactor such as a copper reactor provided with means for effecting stirring or agitation and provided with cooling means such as immersion in a bath of ice and water. My process is effected at atmospheric pressure or at a superatmospheric pressure which is generally not in excess of 100 atmospheres.

The process may be carried out in batch or continuous types of operation. Also, hydrogen fluoride formed in the process may be reacted with ethylene to produce ethyl fluoride, the latter then being reacted with an additional quantity of fluosulfonic acid to form the desired ethyl fluosulfonate.

Ethyl fluosulfonate is useful as an intermediate in organic synthesis and it may be employed also as an insecticide, toxic spray, or a solvent for the separation of hydrocarbons and other organic compounds.

The following example is given to show results obtained in my process although these data should not be misconstrued to limit unduly the broad scope of the invention.

During a period of two hours, 18.7 grams of ethyl fluoride was passed slowly into 81 grams of fluosulfonic acid maintained at a temperature of 0° C. in a glass reactor. Severe etching occurred in the glass reactor, this giving evidence of the liberation of hydrogen fluoride according to the above equation. All of the ethyl fluoride was absorbed by the fluosulfonic acid and then the reaction mixture was treated with supercooled ice until water could be added to the mixture without further evolution of heat. A colorless oil which was heavier than water separated from the resultant mixture. This oil after being washed with water and dried over calcium chloride weighed 34 grams. 95% of the dried oil distilled at 56–57° C. at a pressure of 100 mm. of mercury, it was water-white in color, had a refractive index, $n_D^{20}$, of 1.3494 and a specific gravity, $D^{20}$, of 1.28. This colorless oil had a pungent odor, was insoluble in water and in sulfuric acid, although it is a substituted ester of the latter. It etched glass upon standing in contact therewith for a few hours. These physical properties and behavior of the colorless oil corresponded to those of ethyl fluosulfonate as recorded by Meyer and Schramm for the product that they obtained in 30% yield by the action of fluosulfonic acid upon diethyl ether.

The foregoing specification and example indicate the character and value of this process, although it is not intended that either section should limit unduly the broad scope of the invention.

I claim as my invention:

1. A process for preparing ethyl fluosulfonate which comprises reacting ethyl fluoride and fluosulfonic acid.

2. A process for preparing ethyl fluosulfonate which comprises reacting ethyl fluoride and fluosulfonic acid at a temperature of from about −30° to about 50° C.

3. A process for preparing ethyl fluosulfonate which comprises reacting ethyl fluoride and fluosulfonic acid at a temperature of from about −10° to about +10° C.

4. A process for preparing ethyl fluosulfonate which comprises reacting ethyl fluoride and fluosulfonic acid at a temperature of from about −30° to about 50° C. and at a pressure of from substantially atmospheric to about 100 atmospheres.

5. A combination process for preparing ethyl fluosulfonate which comprises reacting ethyl fluoride and fluosulfonic acid at a temperature of from about −30° to about 50° C. to produce ethyl fluosulfonate and hydrogen fluoride, reacting said hydrogen fluoride with ethylene to produce ethyl fluoride, and supplying the latter to the first mentioned step of the process.

CARL B. LINN.

REFERENCES CITED

The following references are of record in the file of this patent:

UNITED STATES PATENTS

| Number | Name | Date |
| --- | --- | --- |
| 1,510,425 | Traube | Sept. 30, 1924 |

OTHER REFERENCES

Levaillant et al., "Comptes rendus," 169, 140–143 (1919).